United States Patent [19]
Kubo

[11] Patent Number: 4,722,488
[45] Date of Patent: Feb. 2, 1988

[54] APPARATUS FOR WINDING MAGNETIC TAPE INTO CASSETTES

[75] Inventor: Morichika Kubo, Tokushima, Japan

[73] Assignee: Awa Engineering Co., Ltd., Tokushima, Japan

[21] Appl. No.: 938,987

[22] Filed: Dec. 3, 1986

[30] Foreign Application Priority Data

Dec. 23, 1985 [JP] Japan .................. 60-198971[U]

[51] Int. Cl.$^4$ ................. B65H 19/20; G03B 1/04
[52] U.S. Cl. ........................... 242/56 R; 242/179
[58] Field of Search ............... 242/56 R, 179, 75.3

[56] References Cited

U.S. PATENT DOCUMENTS

| | | | |
|---|---|---|---|
| 2,678,173 | 5/1954 | Phelps | 242/75.3 |
| 4,210,266 | 7/1980 | Schoettle | 242/56 R |
| 4,519,553 | 5/1985 | Campbell et al. | 242/56 R |
| 4,589,608 | 5/1986 | Rehklau et al. | 242/56 R |
| 4,632,327 | 12/1986 | Kreeft et al. | 242/56 R |
| 4,635,869 | 1/1987 | Woodley | 242/74 |

Primary Examiner—Stuart S. Levy
Assistant Examiner—Katherine Matecki
Attorney, Agent, or Firm—Wenderoth, Lind & Ponack

[57] ABSTRACT

An apparatus for winding magnetic tape into a cassette case positions and hold a cassette case, extracts and retains leader tape, cuts and splices leader tape to magnetic tape, and winds magnetic tape onto a hub inside the cassette case. Before a predetermined amount of magnetic tape has been wound, the magnetic tape is retained, cut, spliced to leader tape, and the extracted slack tape is wound into the cassette case. The tape retaining mechanism has a first and a second tape retainer which hold cut ends of the leader tape, and a third tape retainer which holds the cut end of magnetic tape. The second tape retainer is moved to a standby position prior to winding magnetic tape. A jet of air, provided by a nozzle aimed through an opening in the side of the cassette case, applies pressure to the leader tape held by the second retainer to draw slack tape into the cassette case.

4 Claims, 9 Drawing Figures

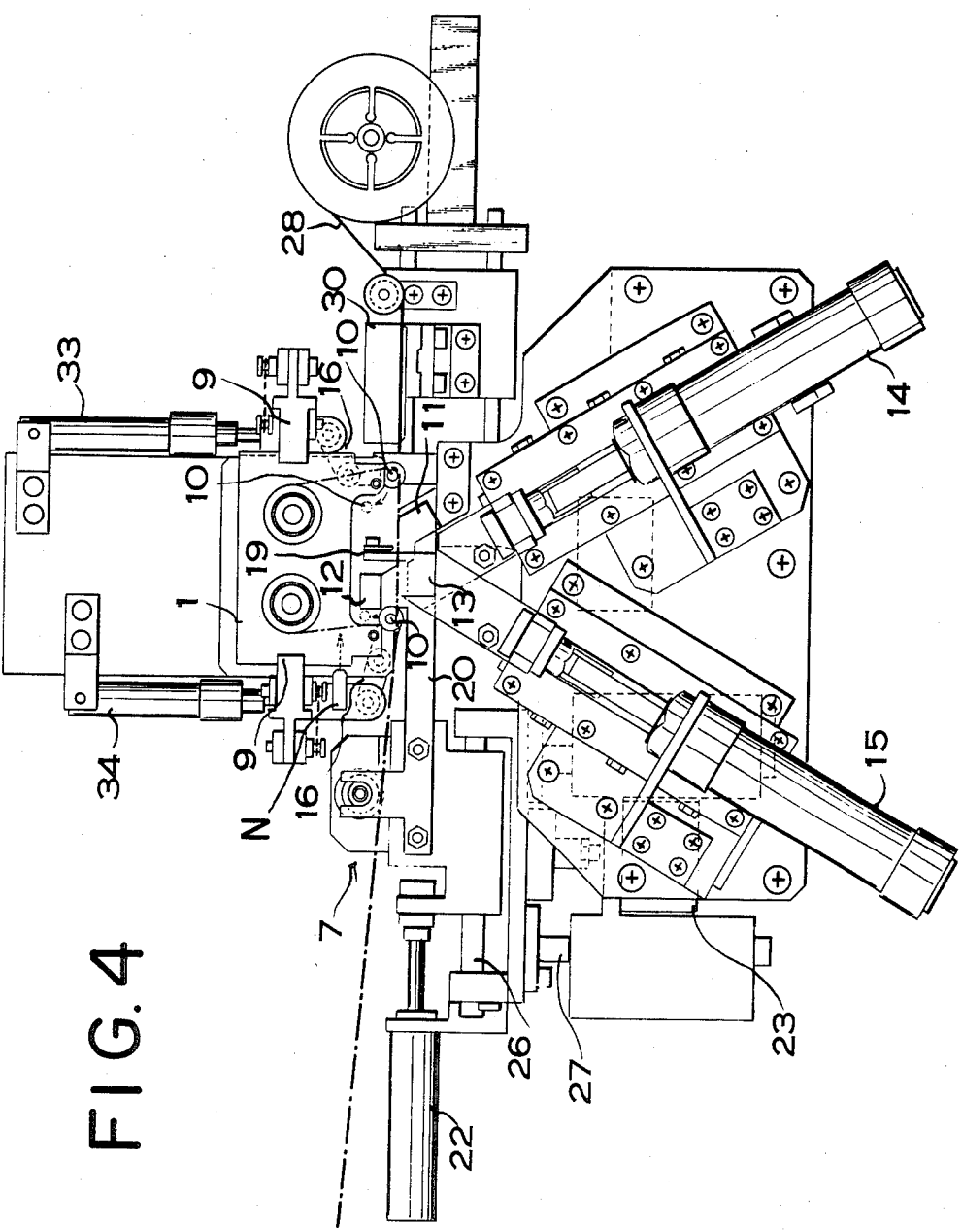

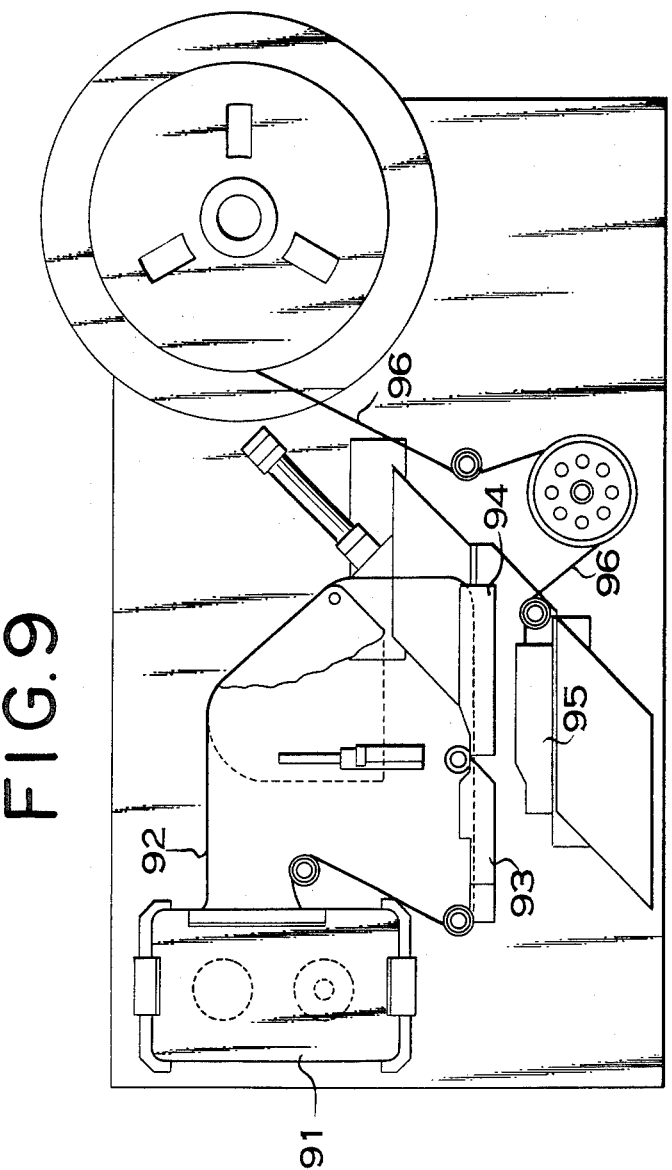

APPARATUS FOR WINDING MAGNETIC TAPE INTO CASSETTES

BACKGROUND OF THE INVENTION

1. Field of the Invention

This invention relates to apparatuses for winding magnetic tape into cassette cases with guard panels, and especially relates to apparatuses which extract leader tape from a cassette case, connect magnetic tape between the leader tape, and wind the tape onto a hub inside the cassette case.

2. Description of the Related Art

There are two basic production methods for magnetic recording tape cassettes. The first method involves loading cassette cases with reel hubs which have already been wound with magnetic tape outside the case. This method requires a large complex apparatus, but the magnetic tape winding time is short, and the processing rate is high. This method is suitable for large scale production facilities.

In the second method, cassettes are prepared by loading reel hubs joined by a length of leader tape into cassette cases. Leader tape is extracted from each cassette case, magnetic tape is connected to the leader tape, and a hub is rotated to wind magnetic tape into the cassette case. This method is characterized in that cassettes can be wound with magnetic tape using a simple small scale winding apparatus. Japanese Patent Publication No. 45203/1977 discloses an apparatus which employs the second method. In this apparatus, as shown in FIG. 9, leader tape 92 is extracted from the cassette case 91, and attached to the first 93 and second 94 tape retainers. The leader tape 92 is cut between the first 93 and second 94 tape retainers to which it is attached, and the third tape retainer 95, which moves as a unit with the second tape retainer 94, and holds magnetic tape 96, is moved next to the first tape retainer 93. Magnetic tape 96 is connected to the end of the leader tape 92, the tape is released from the first 93 and third 95 tape retainers, and the hub inside the cassette case is rotated to wind up the tape. After a predetermined length of magnetic tape 96 has been wound, it is again attached to, and cut between, the first 93 and third 95 tape retainers. The second 94 and third 95 tape retainers are then moved, such that the second tape retainer 94 assumes a position next to the first tape retainer 93, the end of the magnetic tape 96 is joined to the previously cut end of the leader tape 92, and the remaining extracted tape is wound into the cassette case.

In addition to this, an apparatus with a different system of supplying magnetic tape to the severed leader tape has also been developed (Japanese Patent Publication No. 30444/1974). In this apparatus as well, leader tape is extracted from the cassette case, the leader tape is cut, and magnetic tape is joined to one end. After magnetic tape is wound into the cassette case, it is cut, and the cut end of leader tape from the opposite reel is joined with the cut end of the wound magnetic tape.

The inventor has further developed the apparatus for winding magnetic tape shown in FIG. 1, which is disclosed in copending application, Ser. No. 911,985. In this apparatus, leader tape 2 is attached to the first 11 and second 12 tape retainers. Once severed, the cut end of leader tape attached to the second tape retainer 12 is moved to a standby position. At this point, magnetic tape 6 held by the third tape retainer 13 is moved next to the first tape retainer 11, and joined with the leader tape 2. Magnetic tape 6 is then wound onto the hub 24.

In these former models leader tape is severed between reels, and one cut end is moved to a standby position. This movement gives rise to leader tape slack which has a tendency to separate from the extraction guide and, for example, get in the path of the magnetic tape during winding. For this reason, the occurrence of leader tape slack in the former apparatus has been a distinct drawback.

Ideally, to minimize dust contamination, leader tape slack should be withdrawn within the cassette case. In order to wind in the slack leader tape, the hub connected to that piece of leader tape can be rotated. However, the hub with the slack leader tape is not the hub on which magnetic tape is wound, and hence, there is no winding means for that hub. Consequently, by this method, a complicated mechanism is required to take in leader tape slack by applying a fixed torque to the hub with no winding means.

SUMMARY OF THE INVENTION

The objective of the present invention is to provide an apparatus for winding magnetic tape into cassettes, which corrects the above-mentioned drawback. A jet of air is blown into the cassette case against the piece of leader tape, which has one end moved to the standby position. This eliminates slack by withdrawing the leader tape into the cassette case. Specifically, the principal objects of this invention are to provide an apparatus which eliminates leader tape slack rapidly, with a simple mechanism, and without subjecting the leader tape to unnecessary tension forces.

The apparatus for winding magnetic tape into cassette cases comprises: a positioning means for holding the cassette case; a retaining means for holding leader tape, which is connected between reel hubs and extracted from the cassette case, and for holding an end of magnetic tape; a cutting means for cutting leader tape held by the retaining means; a splicing means for joining magnetic tape to an end of leader tape severed by the cutting means; and a winding means for rotating the hub connected to leader and magnetic tape, thereby winding magnetic tape into the cassette case. The retaining means is made up of a first and a second tape retainer, which separately hold the two cut ends of leader tape, and a third tape retainer which holds a cut end of magnetic tape.

The first and second tape retainers attach to the back side of leader tape which has been extracted from the cassette case. Once severed, the cut ends of the leader tape are separated by the movement of at least one of the two tape retainers. One end is moved to a standby position, while the other end is positioned next to the third tape retainer where it is joined with magnetic tape by the splicing means.

An air nozzle is installed to provide a flow of air against the leader tape held by the tape retainer in the standby position. The nozzle blows a jet of compressed air, from outside the cassette case held in place by the positioning means, through an opening, at the leader tape inside the cassette case. Slack leader tape is withdrawn inside the cassette case by pressure applied on the leader tape by the air flow.

As shown in FIG. 1, the extraction guides 10 of the retaining means move from the standby position, represented by broken lines, to the solid line winding position to extract leader tape 2 from the cassette case 1 held in place by the positioning means. The detail of the extraction guide 10 is disclosed in copending application Ser. No. 911,983. The outside surface (the bottom surface as illustrated in FIG. 1) of leader tape 2 is attached to, and held near the cassette case 1. The retaining means has separately movable first 11 and second 12 tape retainers, to which the leader tape 2 outside surface is attached, and between which a cutter (not illustrated in FIG. 1) is inserted to sever the tape. The second tape retainer, shown on the left in FIG. 1, is moved to a standby position, represented by solid lines, thus separating the ends of the severed leader tape 2. This standby position is located such that the second tape retainer 12 does not interfere with the splicing and cutting of magnetic tape 6.

Slack, represented by a broken line in FIG. 1, develops in the leader tape 2, which is held at one end by the second tape retainer 12 in the standby position. The air nozzle N sprays a jet of compressed air, from outside the cassette case 1, in the direction shown by the arrow, at the leader tape. The leader tape 2 is thereby withdrawn into the cassette case 1, as also shown by a broken line in FIG. 1.

The first 11 and second 12 tape retainers remain attached to the severed ends of the leader tape 2. An end of magnetic tape 6 held by a third tape retainer 13 is moved next to the end of the leader tape held by the first tape retainer, and the leader 2 and magnetic 6 tapes are joined by the splicing means. The spliced leader 2 and magnetic 6 tape is released from the tape retainers, the cassette reel hub 24 is rotated, and magnetic tape 6 is wound into the cassette.

When a set length of magnetic tape 6 has been wound into the cassette, hub 24 rotation is stopped, and the magnetic tape 6 is attached to the first 11 and third 13 tape retainers. The cutter is inserted between the first 11 and third 13 tape retainers and the magnetic tape 6 is cut. After the cutter is withdrawn from the tape cutting point, the third tape retainer 13 is lowered to move a cut end of magnetic tape 6 out of the way. Then, the second tape retainer 12 is lowered to line up the cut end of leader tape 2 with the other cut end of magnetic tape 6 held by the first tape retainer 11. The leader 2 and magnetic 6 tapes are joined together, and released from the first 11 and second 12 tape retainers. The extraction guides 10 return from the solid line winding position to the broken line standby position, and the cassette hub 24 is rotated to wind in the slack magnetic 6 and leader 2 tape to the solid line position shown in FIG. 1.

As described above, a jet of air from a nozzle is used to draw slack leader tape, held at one end by the second tape retainer in the standby position, into the cassette case 1. This innovation allows almost instantaneous withdrawal of leader tape slack into the cassette case, and hence avoids the previously mentioned problem of interference with the winding of magnetic tape.

Leader tape slack elimination using air sprayed from a nozzle is characterized by extreme mechanical simplicity, avoidance of unnecessary tension in the leader tape, and non-interference with the movement of the second tape retainer 12 from its standby position to its initial position.

BRIEF DESCRIPTION OF THE DRAWINGS

FIG. 4 is a front view of an embodiment of the present invention.

FIG. 9 is a front view of a specific example of a prior art tape winding apparatus.

DETAILED DESCRIPTION OF THE PREFERRED EMBODIMENT

The following provides an illustrated description of the preferred embodiment of the present invention.

Figure 1:
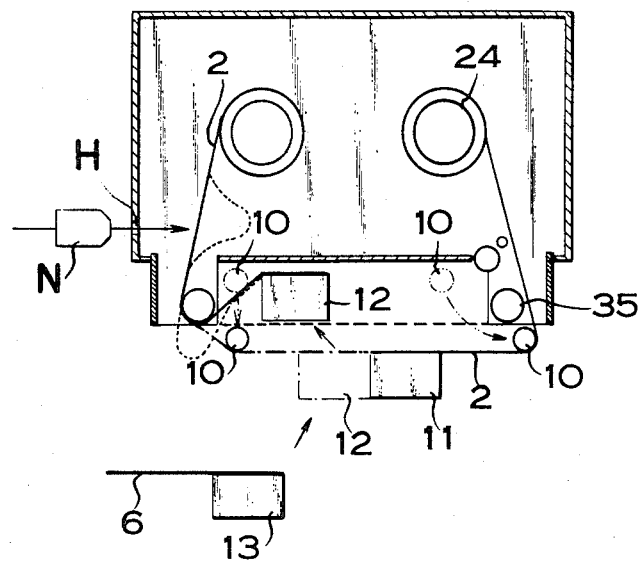
FIG. 1 is a front view.
Figure 3:
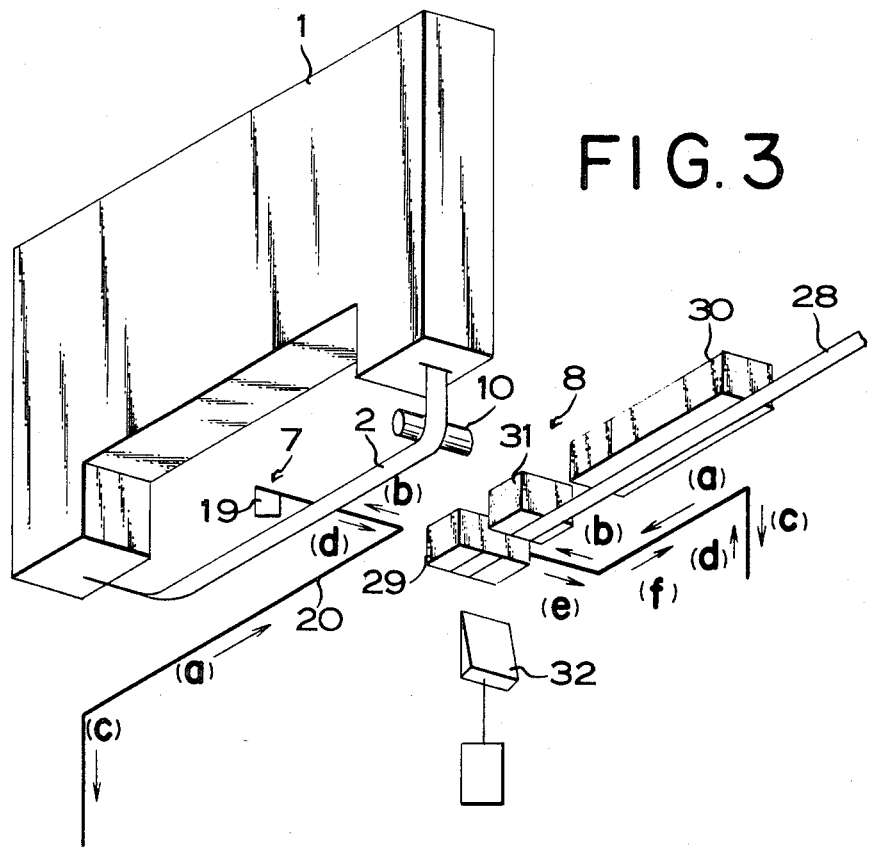
FIG. 3 is an oblique view showing the cutting and splicing means in outline form.
Figure 2:
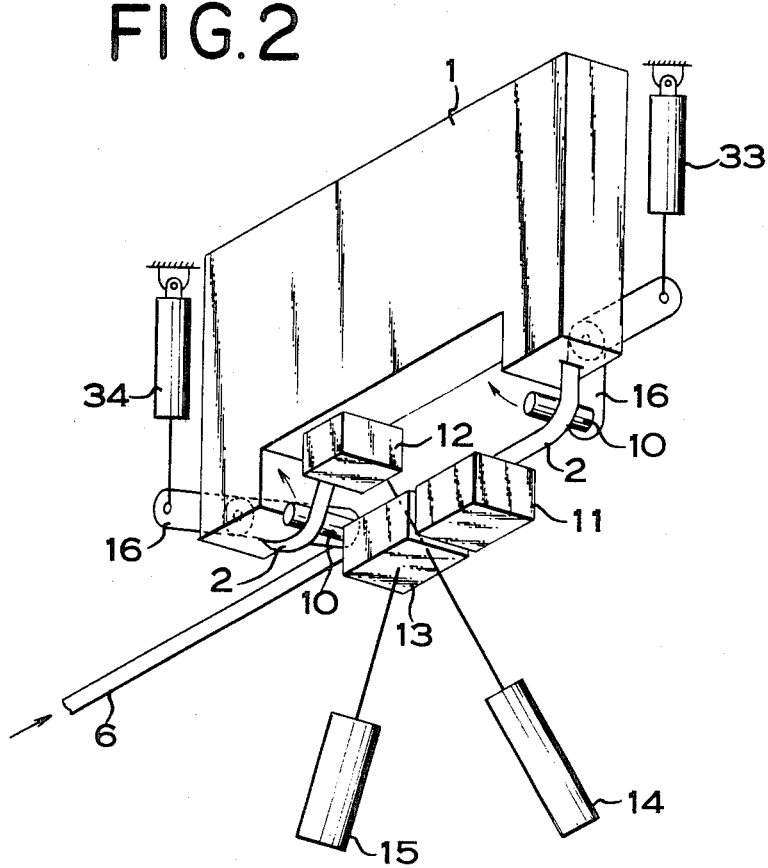
FIG. 2 is an oblique view showing, in outline form, the movement of the retaining means of an apparatus for winding tape into cassettes.

The device for winding cassettes with magnetic tape shown in FIG. 1 through FIG. 3 comprises: a retaining means which holds an end of magnetic tape 6, as well as an end of leader tape 2 which is unwound from a cassette case 1 secured at a set location by a positioning means (not illustrated); a cutting means 7 which cuts the leader tape 2 and magnetic tape 6 held by the retaining means; a splicing means 8 which joins the cut leader tape 2 and magnetic tape 6 by attaching splicing tape; a winding means (not illustrated) which rotates one of the hubs 24, inside the cassette case, to wind up magnetic tape 6; and an air nozzle N which keeps the leader tape 2 within the cassette case 1.

The cassette case 1 positioning means has been used in former models. Any arrangement which can secure the cassette case in a fixed position, and can open the guard panel may be used. For example, an arrangement with claws 9 located on both sides of the cassette case, as shown in FIG. 4, can be used. The claws 9 apply pressure to grip the cassette case 1 by means of springs or other flexible media, or by means of a pressure cylinder.

The cassette case 1 guard panel opening apparatus is also a standard apparatus used in former models. For example, an apparatus, which releases the guard panel lock, and opens the guard panel with an arm or similar structure, may be used.

The retaining means comprises: two tape extraction guides 10 which draw leader tape 2 from the cassette; a first 11, a second 12, and a third 13 tape retainer, which attach to the back side of the leader tape 2 and the magnetic tape 6; and two pressure cylinders 14 and 15 which move the second 12 and third 13 tape retainers.

The tape extraction guides 10 draw leader tape 2 from the cassette case 1 and guide it to the attachment surfaces of the first 11 and second 12 tape retainers. The two tape extraction guides 10 are fixed to two tape extraction arms 16 in a manner that allows them to rotate freely. The tape extraction guides 10 are moved by the tape extraction arms 16 from the broken line standby positions shown in FIG. 4 to the solid line winding positions, thereby unwinding leader tape 2 from the cassette case 1.

When in the winding position, one of the extraction guides 10 also serves as a tape tracking guide (in place of the cassette's internal tape guide) for winding magnetic tape into the cassette case. Therefore, the solid line position of the right extraction guide 10 for winding magnetic tape 6 into the cassette case 1 is such that the path of the magnetic tape 6 is separated from the cassette case's internal tape guide 35.

As shown in FIG. 2, the tape extraction arms 16 are installed behind the cassette case 1, and are free to swing in a vertical plane. One end of each tape extraction arm 16 is attached at a right angle to a tape extraction guide 10, while the other end is connected through a rod to a pressure cylinder. There are two pressure cylinders 33 and 34 which activate the two tape extraction arms 16.

There are also two extraction guides 10, as illustrated in FIG. 1 through FIG. 3, one of which (the rightmost) is used for tracking magnetic tape into the cassette case.

Although it is not illustrated, suction holes are provided on the upper (attachment) surfaces of the first 11, second 12, and third 13 tape retainers for the purpose of holding leader tape 2 and magnetic tape 6 in place. These suction holes are connected to a vacuum system.

Static electricity can be used in place of suction for the attachment of tape to the tape retainers 11, 12, and 13, etc.

The first tape retainer 11 is fixed to a stationary frame, while the second 12 and third 13 tape retainers connect to, and are moved by pressure cylinders 14 and 15.

Leader tape 2 is drawn from the cassette case 1 and attached to the second tape retainer 12. As shown in FIG. 1 and FIG. 2, the second tape retainer 12 assumes a standby position inside the cassette case front cavity while the magnetic tape 6 winding process is performed.

The third tape retainer 13 attaches to the magnetic tape 6 only. It is moved to the position shown in FIG. 2 (the broken line position of FIG. 1) for splicing the magnetic tape with the leader tape 2 and winding the same into the cassette case 1, and it is moved to the solid line position of FIG. 1 during leader tape cutting.

Figure 5:
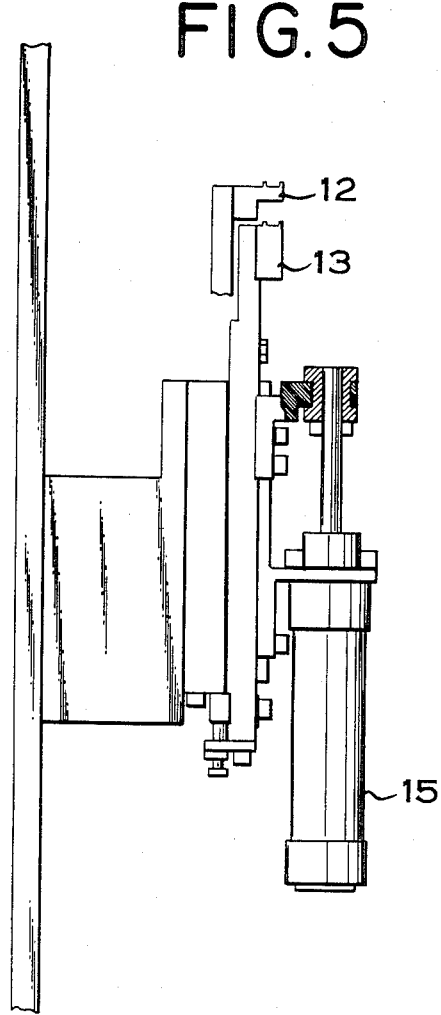
FIG. 5 is a side view showing the assembly for shuttling the second and third tape retainers.

As shown in FIG. 2 and FIG. 4, the second 12 and third 13 tape retainers are fixed to the ends of rods connected to the pressure cylinders 14 and 15. As shown in FIG. 2 and FIG. 5, the second 12 and third 13 tape retainers are positioned to hold tape in the same vertical plane, however the pressure cylinder rod for the second tape retainer 12 is located in back of that for the third tape retainer 13 to allow for independent movement thereof.

Figure 6:
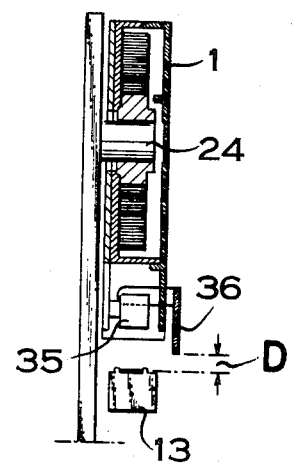
FIG. 6 is a side cutaway view showing the cassette case front cavity.

As shown in FIG. 6, while the first 11 and second 12 tape retainers hold the uncut leader tape 2, the area around the tape is covered by the cassette case 1 and the guard panel, thereby offering protection against dust and foreign objects. For this reason, the first 11 and second 12 tape retainers are located next to the cassette case guard panel at this stage.

In this position, the extracted leader tape 2 is surrounded by the first 11 and second 12 tape retainers, the guard panel, and the cassette case 1. As shown in FIG. 6, a gap D occurs between the guard panel and the tape retainer attachment surfaces. The width of this gap D is, for example, 30 mm or less, more desirably 25 mm or less, and ideally 10 mm or less.

During the procedure of winding magnetic tape 6 into the cassette case 1, the second tape retainer 12 is moved out of the path of the magnetic tape 6, but its standby position is such that leader tape 2 is not exposed outside the cassette case 1 for a long period of time. Therefore, the standby position of the second tape retainer 12 is such that its attachment surface is, for example, 40 mm or less, and more desirably 35 mm or less from the guard panel.

As illustrated in FIG. 1 and FIG. 2, an ideal standby position for the second tape retainer 12 is within the cassette case front cavity. In this case, the leader tape 2 is surrounded by the tape retainers and the cassette case 1.

Figure 7:
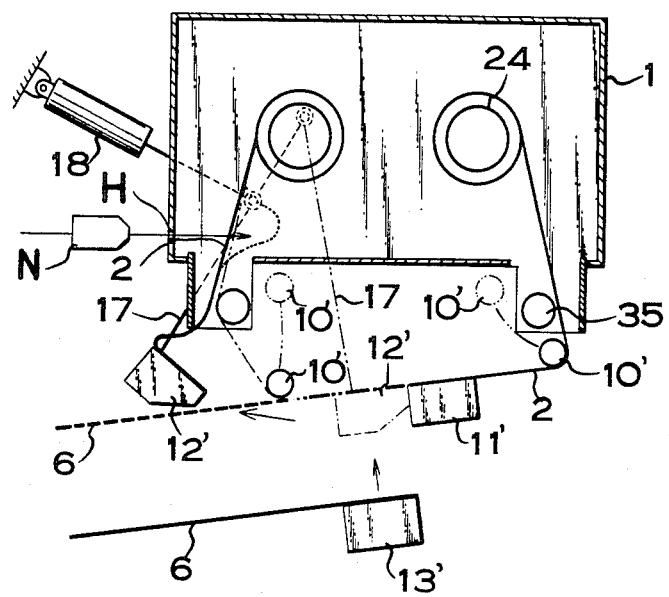
FIG. 7 is a front view of another example showing tape retainer movement in outline form.

The second tape retainer 12' shown in FIG. 7 is fixed to the end of a rotating arm 17, which swings that tape retainer 12', from a position adjacent to the first tape retainer 11', in a direction away from the cassette case. The rotating arm 17 is activated by a pressure cylinder 18, and is installed behind the cassette case 1 to avoid interference with the cassette.

Leader tape 2, attached at one end to the second tape retainer 12 in the standby position, is kept inside the cassette case 1 by air sprayed from a nozzle N. As shown in FIG. 1, FIG. 4, and FIG. 7, the nozzle N is positioned outside the cassette case 1 to spray air against the leader tape 2 through an opening in the cassette case H.

In the practical examples shown in FIG. 1, FIG. 4, and FIG. 7, the nozzle N keeps the leader tape 2 within the cassette case 1 by spraying a narrow jet of compressed air through the opening H in the side of the cassette case 1.

Compressed air is sprayed from the nozzle N when the second tape retainer shown in FIG. 2 is moved to the standby position, or after it has been moved to that position. It is also possible to continuously spray air from the nozzle N.

Figure 8:
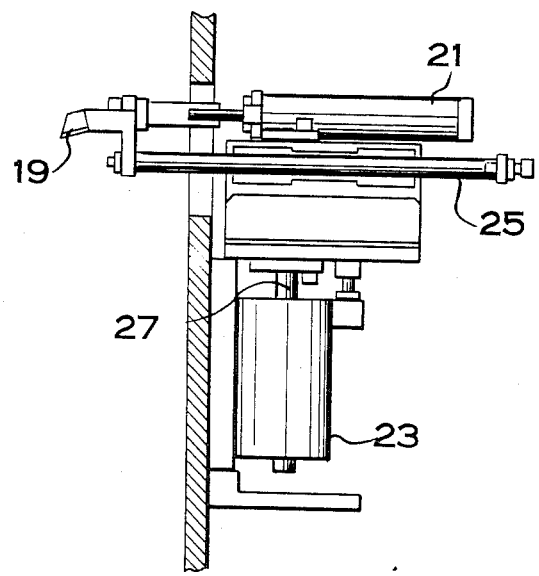
FIG. 8 is a side view showing the fore and aft movement of the cutter.

As shown in FIG. 3, FIG. 4, and FIG. 8, the cutting means 7 comprises a cutter 19, a movable frame 20 which manipulates the cutter 19 to sever the tape, and referring to the directions of FIG. 4, a pressure cylinder 21 which moves the frame 20 fore and aft, a pressure cylinder 22 which moves the frame 20 left and right, and a pressure cylinder 23 which moves the frame 20 up and down.

As shown in FIG. 4 and FIG. 8, the movable frame 20 is fixed to the end of the pushrod of the fore and aft pressure cylinder 21. The fore and aft cylinder 21 is fixed to the pushrod of the left and right pressure cylinder 22, which is in turn fixed to the pushrod of the up and down pressure cylinder 23. The up and down pressure cylinder is fixed to the stationary frame of the device.

The movable frame 20 is guided parallel to the guide bars 25, 26, and 27 in the fore and aft, left and right, and up and down directions respectively.

Referring to FIG. 3, tape is cut by the cutter 19 as follows.

(1) The cutter 19, which is originally located behind the the tape, is moved to the right, to the cutting position at the center of the tape. The movable frame is in the raised position during this operation.
(2) Next, with the cutter 19 still in the raised position, it is moved forward to a location on top of the tape 2 or 6.
(3) The cutter 19 is lowered to the surface of the tape for cutting.
(4) The cutter 19 is drawn back severing the tape 2 or 6.

As shown in FIG. 3 and FIG. 4 the splicing means comprises a pressure block 29, three pressure cylinders (not illustrated) to move the pressure block 29 fore and aft, left and right, and up and down, and a splicing tape supply system to deliver splicing tape 28 to the bottom surface of the pressure block 29. The pressure block 29 holds the splicing tape 28, which it presses onto the upper surfaces of the leader 2 and magnetic 6 tapes to perform a splice.

The pressure block 29 is constructed in the same manner as the movable frame 20 with three sets of pressure cylinders and guide bars. With splicing tape 28 attached to the bottom surface, the pressure block 29 joins the tapes 2 and 6 as follows.

(1) While in the raised position, the pressure block 29 is moved to the left to line up with the splice line.
(2) Still in the raised position, the pressure block 29 is moved forward to a position on top of the tape.
(3) The pressure block 29 is lowered to the splice, and splicing tape 28 is pressed onto the leader 2 and magnetic 6 tapes to join them.
(4) The pressure block 29 is raised.
(5) The pressure block 29 is moved backward away from the tape.
(6) The pressure block 29 is moved to the right, returning it to the standby position.

For each splice, steps (1) through (6) are repeated, thus joining the leader 2 and magnetic 6 tapes by attaching adhesive splicing tape to their upper surfaces.

The splicing tape supply system, which delivers a predetermined length of splicing tape 28 to the bottom surface of the pressure block 29 comprises, a shuttle block 30, which draws splicing tape 28 off of a spool, an interim block 31 located between the shuttle block 30 and the pressure block 29, which attaches to the nonadhesive surface of the end of the splicing tape 28, and a cutter 32, which cuts the splicing tape 28 at the surface of the pressure block that faces the shuttle block 31.

The bottom attachment surfaces of the shuttle block 30, the interim block 31, and the pressure block 29 in the standby position are all aligned in the same plane. Although it is not illustrated, the bottom surfaces of all these blocks have suction holes to allow attachment of the splicing tape 28. These suction holes are connected to a vacuum system through control valves.

With splicing tape 28 attached to its bottom surface, the shuttle block 30 is moved from the right to the left, delivering a fixed length of splicing tape to the interim block 31 and the pressure block 29. When the shuttle block 30 is moved from the left to the right, splicing tape 28 is released from the bottom of that block. At this point, the end of the splicing tape 28 is held attached to the bottom surfaces of the interim block 31 and the pressure block 30. The cutter 32 is raised to cut the thus held splicing tape 28 at the surface of the pressure block 29 that faces the interim block 31.

During operation of the splicing means to join leader 2 and magnetic 6 tapes, the cutter 19, which severs either leader 2 or magnetic 6 tape, is withdrawn to a position out of the path of the pressure block 29.

The apparatus for winding magnetic tape into cassettes having the construction described above, winds magnetic tape into cassettes by performing the following procedure.

(1) The cassette case 1 is secured in a fixed position and the guard panel is opened.
(2) The tape extraction guides 10 positioned adjacent the inner side surface of the exposed leader tape 2, draw leader tape from the cassette case 1, and attach it to the upper surfaces of the first 11 and second 12 tape retainers. At this point, the first 11 and second 12 tape retainers are adjacent one another with their attachment surfaces aligned in the same plane, and the third tape retainer 13 is in a standby location shown by the solid line position in FIG. 1.
(3) The cutter 19 severs the leader tape 2 between the first 11 and second 12 tape retainers. During this operation, the leader tape 2 is held attached to the first 11 and second 12 tape retainers.
(4) The second tape retainer 12 is moved away from the first tape retainer 11 to a standby position, while the nozzle N blows air on the leader tape 2 attached to the second tape retainer 12 to take up slack and draw the leader tape 2 inside the cassette case 1. The third tape retainer 13 is moved adjacent to the first tape retainer 11, so that its upper surface thereof is aligned in the same plane with that of the first tape retainer 11. At this stage also, leader tape 2 is held attached to the first 11 and second 12 tape retainers, and magnetic tape 6 is held attached to the third tape retainer 13.
(5) The leader tape 2 and magnetic tape 6, held by the adjacent and coplanar first 11 and third 13 tape retainers, are joined together by the splicing means.
(6) Next, the spliced leader 2 and magnetic 6 tape is released from the first 11 and third 13 tape retainers, and the cassette hub 24, to which the leader tape 2 is attached, is rotated by the winding means to wind the connected magnetic tape 6 into the cassette case 1. During this operation, magnetic tape 6 is guided into the cassette case 1 by the right extraction guide 10, and the cassette's internal tape tracking guide is not used.
(7) After a predetermined length of magnetic tape 6 has been wound, the hub 24 rotation is stopped, and the first 11 and third 13 tape retainers attach to the magnetic tape 6.
(8) The cutter 19 severs the magnetic tape 6 between the first 11 and third 13 tape retainers.
(9) The third tape retainer 13, with the magnetic tape 6 attached, is moved to its standby position shown by solid lines in FIG. 1, while the second tape retainer 12 is moved from its solid line standby position to the broken line position shown in FIG. 1, adjacent to the first tape retainer 11.
(10) The end of the magnetic tape 6, held by the first tape retainer 11, is joined to the cut end of the leader tape 2, held by the second tape retainer 12, by the splicing means. In steps (8), (9), and (10) of this procedure, tape is held attached to the first, second, and third tape retainers 11, 12, and 13.
(11) Tape is released from the first 11 and second 12 tape retainers, and the extraction guides 10 are moved to the broken line position shown in FIG. 1.
(12) The hub 24 is rotated to take up the slack tape into the cassette case 1.
(13) The cassette case 1 is replaced with another case not wound with magnetic tape.

This procedure is repeated and subsequent cassette cases are wound with magnetic tape.

In the apparatus of this invention shown in FIG. 4, the cassette case is vertically oriented with the cassette case front cavity facing downward. Leader tape extracted from the cassette case is surrounded by the cassette case, the guard panel, and the tape retainers, thereby protecting that leader tape from dust.

It is also possible to invert the apparatus of FIG. 4 so that the cassette case front cavity faces upward, and the upper surface of the extracted leader tape is covered by the tape retainers.

Regardless of the cassette case orientation, the specified relative position of the tape retainers with respect to the cassette case allows the extracted leader tape to be surrounded by the cassette case, the tape retainers, and the guard panel, and the leader tape is thus afforded protection against foreign object attachment.

Accordingly, the present invention does not limit the manner in which the cassette case is positioned.

The cassette case shown in FIG. 6 has a double bottom, such that the outermost panel is free to slide over the body of the cassette case and close off the hub openings when removed from the tape winding apparatus. Furthermore, closing of the guard panel 36 allows complete enclosure of the magnetic tape wound into the cassette. This type of cassette case allows extreme reduction in the amount of dust that gets on the magnetic tape after it has been wound into that cassette.

What is claimed is:

1. An apparatus for winding magnetic tape into a cassette having a cassette case formed with a front cavity, rotatable hubs within the cassette case and between which hubs leader tape extends, and an opening extending through the cassette case, said apparatus comprising:

positioning means for holding the cassette case;

tape retaining means for extracting leader tape from the cassette and for holding the leader tape at a first position when so extracted, said tape retaining means comprising a first and a second tape retainer on which the leader tape is held, and a third tape retainer for holding a leading end of the magnetic tape;

cutting means for cutting the leader tape held by the first and the second tape retainers, one cut end of the leader tape being held on the first tape retainer while another cut end of the leader tape is held on the second tape retainer;

means for moving one of said first and said second tape retainers from said first position to a standby position so as to separate said one cut end of the leader tape from said another cut end of the leader tape and for moving the other of said first and said second tape retainers to a position adjacent the third tape retainer;

splicing means for joining the leading end of the magnetic tape to the cut end of the leader tape held on said other of said tape retainers after said other of said tape retainers is moved adjacent the third tape retainer;

an air nozzle for blowing a jet of air at the leader tape within the cassette case that is held on said one of said tape retainers to draw the leader tape that has become slack into the cassette case; and winding means for rotating one of said hubs to wind a predetermined length of the magnetic tape joined to the leader tape into the cassette case, said cutting means also for cutting the magnetic tape after being wound into the cassette so as to form a trailing end thereof, and said splicing means also for joining the trailing end of the magnetic tape to the other of the cut ends of the leader tape.

2. An apparatus for winding magnetic tape into a cassette as claimed in claim 1,
wherein said moving means is for moving said one of the tape retainers to a standby position that is located inside the front cavity of the cassette case and for maintaining said one of said tape retainers in said standby position until the predetermined length of the magnetic tape is wound into the cassette.

3. An apparatus as claimed in claim 1,
wherein said nozzle is positioned outside of said cassette case adjacent said opening when the cassette case is held by said position means for blowing the jet of air through said opening and into the cassette case.

4. An apparatus as claimed in claim 1, and in which said opening extends through a side of said cassette case, said side extending perpendicular to the front cavity,
wherein said nozzle is positioned outside of said cassette case adjacent the side thereof when the cassette case is held by said position means for blowing the jet of air through said opening and into the cassette case.

* * * * *